US006958965B2

(12) United States Patent
Ueda et al.

(10) Patent No.: US 6,958,965 B2
(45) Date of Patent: Oct. 25, 2005

(54) INFORMATION RECORDING DISC AND INFORMATION REPRODUCING SYSTEM

(75) Inventors: Hiroshi Ueda, Osaka (JP); Yoshihisa Fukushima, Osaka (JP); Motoshi Ito, Osaka (JP); Shinji Sasaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 452 days.

(21) Appl. No.: 09/754,144

(22) Filed: Jan. 5, 2001

(65) Prior Publication Data

US 2001/0007545 A1 Jul. 12, 2001

(30) Foreign Application Priority Data

Jan. 7, 2000 (JP) .................................... P2000-001214

(51) Int. Cl.[7] .................................................. G11B 7/00
(52) U.S. Cl. ............................ 369/53.21; 369/47.13; 369/53.31; 369/83
(58) Field of Search .......................... 369/53.21, 47.13, 369/47.1, 47.15, 47.22, 47.55, 53.11, 53.31, 53.45, 53.37, 83, 52.1, 52.13

(56) References Cited

U.S. PATENT DOCUMENTS

| 5,382,776 | A | * | 1/1995 | Arii et al. ................... 369/52.1 |
| 5,671,202 | A | * | 9/1997 | Brownstein et al. ..... 369/53.22 |
| 5,761,301 | A | * | 6/1998 | Oshima et al. .............. 369/272 |
| 5,809,007 | A | * | 9/1998 | Takemura et al. ....... 369/30.09 |
| 6,002,657 | A | * | 12/1999 | Furukawa et al. ....... 369/53.22 |
| 6,034,934 | A | * | 3/2000 | Miyake et al. ........... 369/53.28 |
| 6,052,465 | A | * | 4/2000 | Gotoh et al. ............. 369/53.21 |
| 6,141,483 | A | * | 10/2000 | Yamada et al. ................ 360/27 |
| 6,418,111 | B1 | * | 7/2002 | Takemura et al. ........ 369/275.3 |
| 6,608,804 | B2 | * | 8/2003 | Shim ........................ 369/53.22 |
| 2002/0085466 | A1 | * | 7/2002 | Shim ........................ 369/53.22 |

FOREIGN PATENT DOCUMENTS

| EP | 0851418 | 7/1998 |
| EP | 1058254 | 12/2000 |
| GB | 2332977 | 7/1999 |
| WO | 97/14147 | 4/1997 |
| WO | 98/58368 | 12/1998 |

OTHER PUBLICATIONS

Patent Abstracts of Japan, vol. 1999, No. 10, Aug. 31, 1999 & JP 11143642 (Matsushita Electric Ind Co Ltd), May 28, 1999.

* cited by examiner

*Primary Examiner*—W R. Young
*Assistant Examiner*—Jorge Ortiz-Criado
(74) *Attorney, Agent, or Firm*—Wenderoth, Lind & Ponack, L.L.P.

(57) ABSTRACT

An information recording disc has a burst cutting area (BCA) for recording control information for a reproducing apparatus be removing a reflective layer of the disc in a striped shape and a data recording area for recording user data. The burst cutting area includes at least one BCA control information area. The BCA control information area has an application identifier area for identifying applications of control data, a data length area for indication data length of the control data, and an application specific data area data area recording the control data. Also, an information reproducing drive reproduces data from the information recording disc.

8 Claims, 9 Drawing Sheets

| BLANK AREA | REF. SIGNAL AREA | BLANK AREA | CTRL DATA AREA | BLANK AREA |
|---|---|---|---|---|

| CTRL DATA BLOCK 0 | | CTRL DATA BLOCK 1 | | ... | CTRL DATA BLOCK 191 | |
|---|---|---|---|---|---|---|
| PHYS. FORMAT INF. (SECTOR 0) | RESERVATION (SECTORS 1~15) | PHYS. FORMAT INF. (SECTOR 0) | RESERVATION (SECTORS 1~15) | | PHYS. FORMAT INF. (SECTOR 0) | RESERVATION (SECTORS 1~15) |

Fig. 7C PRIOR ART

| SECTOR HEADER AREA | DATA ID |
|---|---|
| | DISC REGION INF. |
| | IED |
| USER DATA AREA | DISC TYPE INF. |
| | DISC SIZE INF. |
| | READ-OUT RATE INF. |
| | DISC STRUCTURE INF. |
| | REC. DENSITY INF. |
| | DATA AREA ALLOCATION INF. |
| | BCA EXISTENCE INF. |
| | RESERVATION |
| | EDC |

| REGION 0 FLAG | REGION 1 FLAG | REGION 2 FLAG | ... | REGION 7 FLAG |
|---|---|---|---|---|

INFORMATION RECORDING DISC AND INFORMATION REPRODUCING SYSTEM

BACKGROUND OF THE INVENTION

1. Field of the Invention

The present invention relates to an information recording disc for recording control information in a burst cutting area (BCA), an information reproducing drive for reproducing information by using an information recording disc for recording information signals including program data, audio information and video information and an information reproducing system including the information reproducing drive.

2. Description of the Prior Art

Conventionally, a floppy disk, a hard disk, a compact disc read-only memory (CD-ROM), etc. are known as information storage media for storing program data, audio information and video information. Especially, since the CD-ROM is a portable medium having a storage capacity exceeding 600 MB and can be manufactured at low cost, the CD-ROMs have come into wide use for distributing various software.

On the other hand, thanks to recent remarkable improvements of performance of personal computers, it has become possible to handle audio and video (AV) data on the personal computers. For example, applications in which digital moving picture data files employing a video compression method called "Moving Picture Experts Group 1" (MPEG1) are recorded in the CD-ROM or the like and are distributed are on the increase. However, the MPEG1 has high compression ratio but suffers from extraordinary deterioration of video. Therefore, these applications are unsuitable for a case requiring high-quality video such as movies.

Thus, an advanced video compression method called "Moving Picture Experts Group 2" (MPEG2) and an optical disc having a capacity as large as 5 GB, i.e., a digital versatile disc (DVD) have been developed in recent years. By combining these two technologies, the DVD is capable of recording high-quality digital AV data for not less than two hours and therefore, is fully expected to serve as a next-generation AV data storage medium. Systems for reproducing the DVD are roughly classified into two groups. One of the systems belongs to a field of consumer electronics and is called a DVD player in which a functional block for reproducing compressed AV data from the DVD and a functional block for expanding the compressed AV data are integrated. The other system belongs to a field of computers and is a computer system which includes a DVD drive and an AV decoding card. The DVD drive has a function of reproducing compressed AV data and control data of contents from the DVD, while the AV decoding card has a function of expanding the compressed AV data. These two devices are independent of each other and are installed into a computer. For example, the DVD drive is provided in an expansion bay of the computer, while the AV decoding card is inserted into an expansion slot of the computer. Through control of the computer, the compressed AV data reproduced by the DVD drive is expanded by the AV decoding card on the basis of the control data reproduced by the DVD drive such that AV data is reproduced. A computer system in which a video CD player, a CD-ROM drive and a MEPEG1 decoder board are incorporated is similar to this configuration.

However, since the system in the field of consumer electronics and the system in the field of computers can reproduce the same medium, i.e., the DVD, it is, in fact, difficult to copyright protect, etc. International Publication No. WO97/14147 discloses a technique for copyright protecting and a technique for classifying apparatuses according to applications or regions. In this prior art document, by using an information recording medium in which scrambled (or enciphered) data and key information for descrambling are recorded, descrambling circuits are provided in information reproducing apparatuses and mutual authentication for safely exchanging the key information among the information reproducing apparatuses is performed, whereby an aim of copyright protecting is achieved. Meanwhile, descrambling varying according to applications or regions is performed and the information reproducing apparatuses are classified according to kinds of the descrambling circuits of the information reproducing apparatuses into ones in which descrambling is possible and the remainder in which descrambling is not possible.

By classifying the information reproducing apparatuses according to regions, ethical problems can be solved. Ethical ideas depend on climates, customs and religions of countries and therefore, vary according to countries. Hence, such a case may happen that contents which offer no ethical problem in one country pose an ethical problem in another country. In such a case, it is necessary to adopt a measure for preventing reproduction of the ethically undesirable contents in the latter country.

Figure 6:
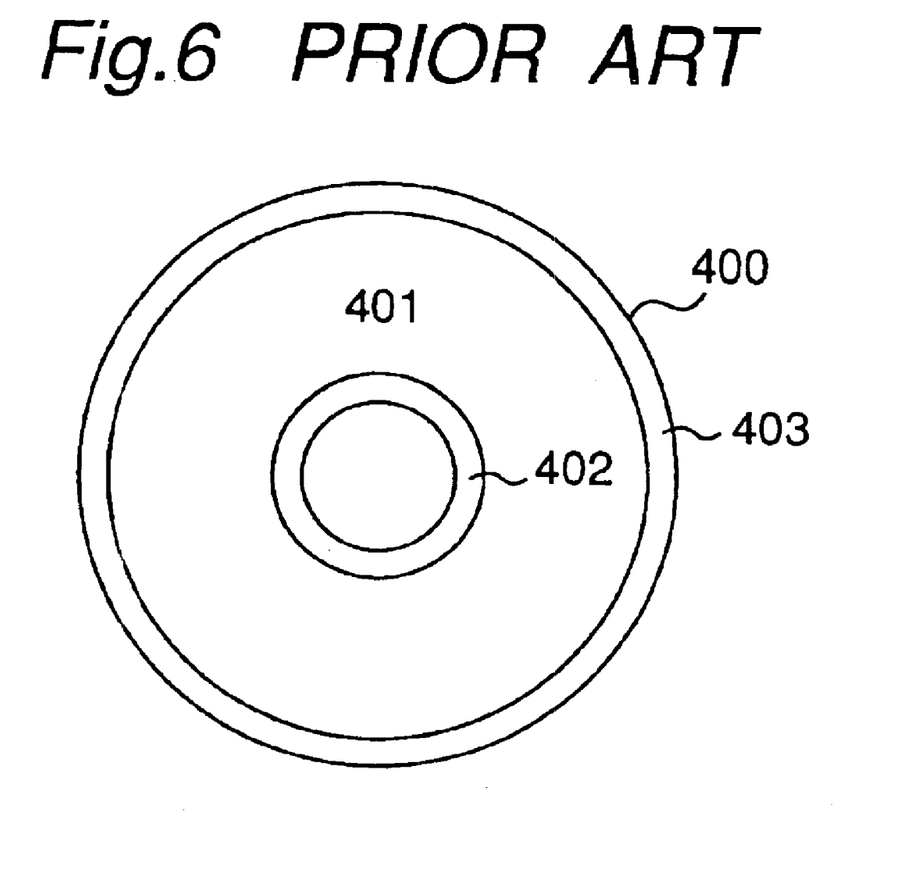
FIGS. 6 and 7A to 7D are views showing data layout of a prior art AV data recording disc.
Figures 7A, 7B:
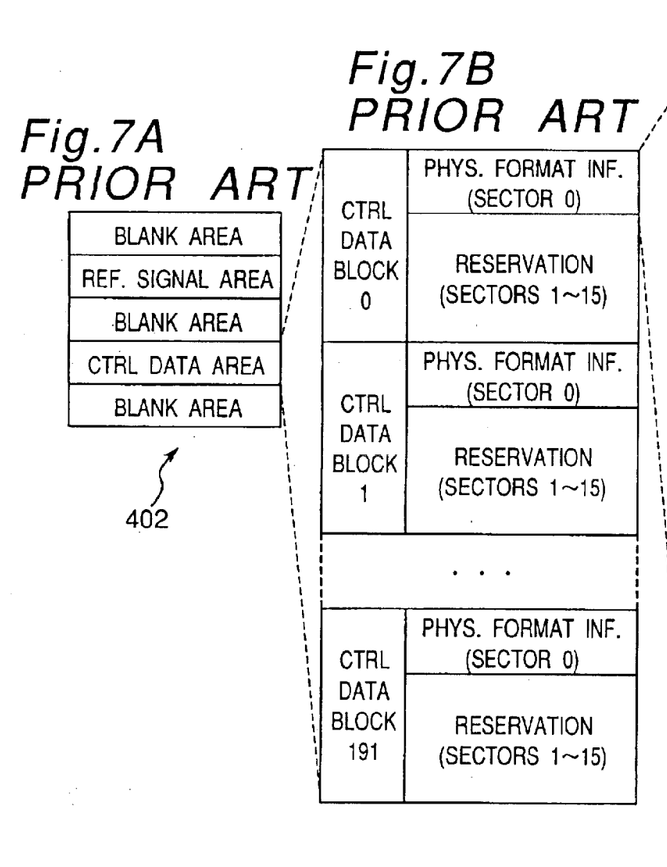
Figure 7C:
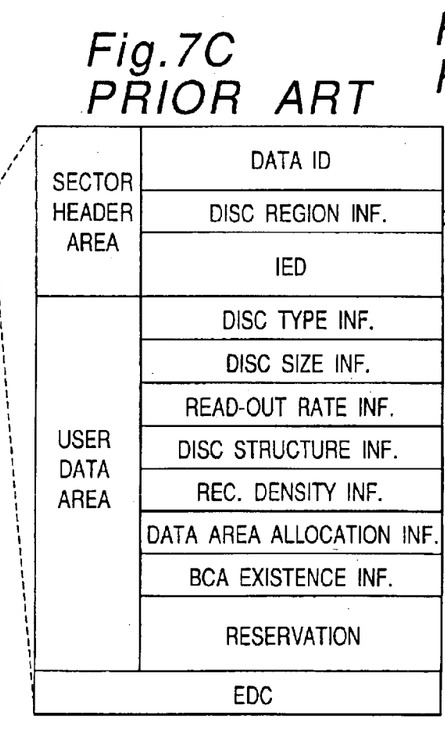
Figure 7D:
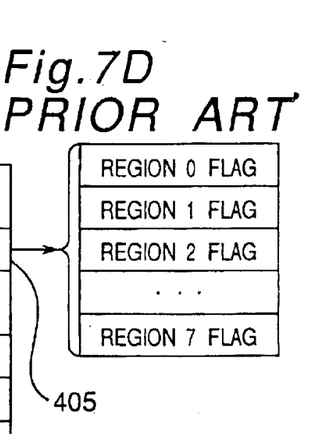

Hereinafter, a conventional method of classifying information reproducing apparatuses according to regions is described. FIGS. 6 and 7A to 7D show the data structure of a known AV data recording disc 400. In FIGS. 6 and 7A to 7D, the known AV data recording disc 400 is sectioned into information recording units called "sectors" and is divided into a lead-in area 402 for recording control information referred to by the information reproducing apparatuses, a lead-out area 403 and a data recording area 401 for mainly recording user data. Each sector includes a sector header area in which a data identifier (ID) for identifying the sector, etc. are recorded and a user data area in which control information, user data, etc. are recorded. FIG. 6 shows the known AV data recording disc 400, while FIGS. 7A to 7D show the lead-in area 402 of the known AV data recording disc 400. Namely, FIG. 7A shows the lead-in area 402 of the known AV data recording disc 400 of FIG. 6, FIG. 7B shows a control data area of the lead-in area 402 of FIG. 7A, FIG. 7C shows physical format information in the control data area of FIG. 7B and FIG. 7D shows disc region information 405 in the physical format information of FIG. 7C.

This known AV data recording disc 400 is characterized in that a sector storing the disc region information 405 exists in a sector header area of the lead-in area 402. The lead-in area 402 is constituted by blank areas in which "00h" (h=hexadecimal number) is recorded, a reference signal area in which a reference signal for reproduction is recorded and the control data area in which the control information referred to by the information reproducing apparatuses is recorded. In the control data area of FIG. 7B, identical information is recorded in 192 control data blocks each constituted by 16 sectors. The physical format information is recorded in the first sector of the control data block. In a user data area of the physical format information, physical information such as disc type information indicative of a read-only disc or a rewritable disc and disc size information indicative of a size of 120 mm or 80 mm of the disc is recorded.

On the other hand, in the sector header area of the physical format information, the disc region information 405 is recorded together with the data ID and ID error detection (IED) acting as a code for detecting error in the sector header area. The disc region information 405 is constituted by region n flags (n=integer from 0 to 7) which indicate whether or not reproduction in each of eight divided regions is permitted. When a flag corresponding to a region in which the information reproducing apparatus is installed is set to "1", it means that reproduction in the region is permitted. In order to perform such reproduction control, the information reproducing apparatus should possess information corresponding to the region for its installation and have a function of stopping reproduction in case this information is not coincident with the disc region information 405.

Meanwhile, peripheral devices in the computer market are common throughout the world and are contrary to DVD players, etc. in the consumer electronics market, for which distribution channels are built up in respective regions due to different power source voltages among the regions or different standards for video signals such as "National Television System Committee" (NTSC) and "Phase Alternation by Line" (PAL). Thus, in cost and distribution, apparatuses whose specifications vary according to regions are disadvantageous for users. On the other hand, if regional information of the apparatuses is rewritable from outside, the regional information can be newly changed to illicit regional information any number of times and thus, reproduction control in each of the regions does not function properly.

Therefore, in the DVD drive acting as a conventional peripheral device for computers, a scheme is introduced in which the regional information of the apparatuses can be updated only a limited number of times. In this scheme, the disc region information 405 of the AV data recording disc 400 inserted by the user is basically regarded as corresponding to a region for installation of the information reproducing apparatus so as to be stored, as a regional code of the information reproducing apparatus, in a nonvolatile memory and the regional code of the information reproducing apparatus can be changed only an initial predetermined number of times.

Figure 8:
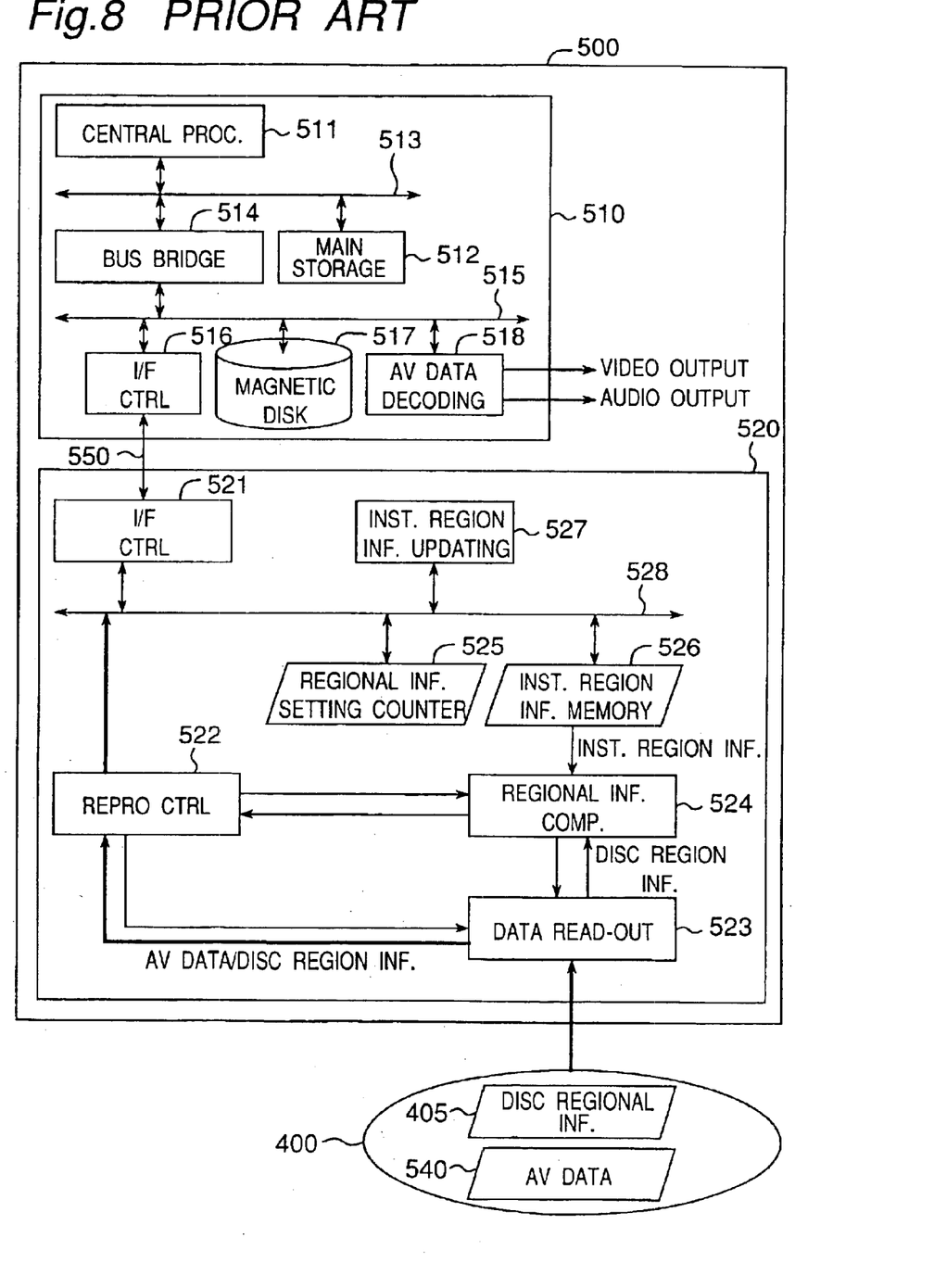
FIG. 8 is a block diagram showing a configuration of a prior art information reproducing system.

Hereinafter, a conventional regional information control method is described with reference to FIGS. 8 and 9. FIG. 8 shows a configuration of a conventional information reproducing system 500. The conventional information reproducing system 500 includes a host computer 510 and a disc reproducing drive 520 which are connected to each other by a device interface bus 550. The host computer 510 includes a central processing circuit 511, a main storage 512, a processor bus 513, an external bus 515, an interface control card 516 for performing protocol control with the disc reproducing drive 520, a magnetic disk unit 517 and an AV data decoding card 518 for converting compressed digital AV data into analog AV signals.

Meanwhile, the disc reproducing drive 520 includes an interface control circuit 521 connected to the host computer 510, a data read-out means 523 for reading various information from the AV data recording disc 400, a regional information comparing means 524 for deciding whether or not the disc region information 405 of the AV data recording disc 400 is coincident with installation region information of an installation region information memory 526 of the disc reproducing drive 520, a reproduction control means 522 for effecting changeover between prohibition and permission of delivery of AV data 540 of the AV data recording disc 400 in accordance with the decision of the regional information comparing means 524, an installation region information updating means 527 for updating the installation region information memory 526 and a regional information setting counter 525 only a limited number of times and a control bus 528.

Figure 9:
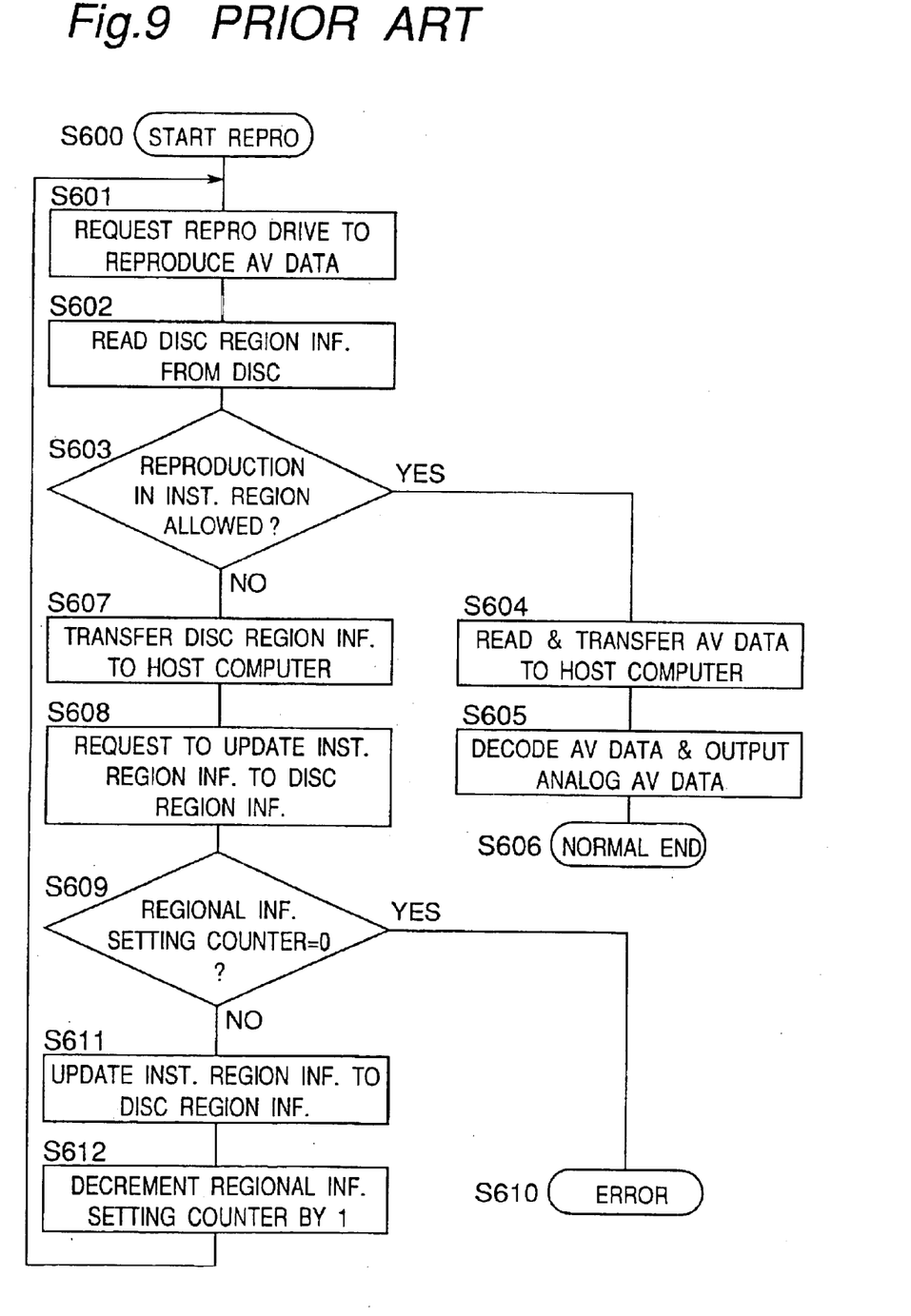
FIG. 9 is a flowchart showing sequence of data reproduction of the prior art information reproducing system of FIG. 8.

FIG. 9 shows sequence in which the conventional information reproducing system 500 reproduces the AV data 540 recorded in the AV data recording disc 400. In response to a request for data reproduction from a user at step S600, reproduction application software stored in the main storage 512 issues a command of reproduction of the AV data 540 to the disc reproducing drive 520 via the interface control card 516 at step S601. In response to the reproduction command from the interface control circuit 521, the reproduction control means 522 advances to the regional information comparing means 524 a request for comparison and decision of the regional information. In response to this request from the reproduction control means 522, the regional information comparing means 524 issues an instruction of read-out of the disc region information 405 to the data read-out means 523 at step S602. By comparing the read disc region information 405 and the installation region information of the installation region information memory 526 with each other in the regional information comparing means 524, a decision is made at step S603 as to whether or not the disc region information 405 permits reproduction in a region indicated by the installation region information memory 526.

In the case of "YES" at step S603, the reproduction control means 522 issues an instruction of read-out of the AV data 540 to the data read-out means 523 at step S604. Through the reproduction control means 522 and the interface control circuit 521, the AV data 540 is converted into analog AV signals by the AV data decoding card 518 in the host computer 510 so as to be outputted at step S605. On the other hand, in the case of "NO" at step S603, the host computer 510 requests transfer of the disc region information 405. In response to the request for transfer of the disc region 405, the reproduction control means 522 transfers the disc region information 405 from the data read-out means 523 to the host computer 510 at step S607. Then, at step S608, the host computer 510 issues to the disc reproducing drive 520 a request for update of the installation region information so as to make the installation region information of the installation region information memory 526 coincident with the disc region information 405.

In response to the update request from the host computer 510 via the interface control circuit 521, the installation region information updating means 527 decides whether or not count of the regional information setting counter 525 is zero at step S609. In the case of "YES" at step S609, a report of error is issued to the host computer 510 at step S610 by judging that setting has been already performed the permissible limited number of times. In this case, the AV data 540 on the AV data recording disc 400 is not reproduced. On the other hand, in the case of "NO" at step S609, the installation region information updating means 527 updates the installation region information of the installation region information memory 526 to the disc region information 405 at step S611 and count of the regional information setting counter 525 is decremented by 1 at step S612. Subsequently, the program flow returns to step S601. At this time, since the installation region information of the installation region information memory 526 is coincident with the disc region information 405, reproduction of the AV data 540 is performed normally.

However, in the conventional regional information setting method referred to above, in a case a where a virus program which continuously issues a request for change of the installation region information of the installation region information memory 526 from the host computer 510, such a problem may arise that since the installation region information has been updated the limited number of times while being set to the regional information irrelevant to the installation region, it is impossible to change the installation region information of the installation region information memory 526. In such a case, even if the AV data recording disc 400 conforms to the installation region, the user cannot reproduce the AV data recording disc 400.

In order to solve this problem, it is necessary to provide a recovery means which recovers the installation region information from a state where the installation region information cannot be changed while being set to the regional information irrelevant to the installation region and enables new setting of the installation region information. However, if the recovery means is made available for general users, the installation region information can be changed any number of times, so that the original purpose of performing reproduction control in accordance with the installation region cannot be attained.

Consequently, only a limited number of persons such as a manufacturer of the disc reproducing drive or the information reproducing system should be entitled to execute the above mentioned recovery means. Furthermore, instead of a scheme that the recovery means is materialized by only a software program which operates on a host computer and can be copied and distributed easily, it is necessary to adopt a safe scheme including an equipment whose copying is difficult.

SUMMARY OF THE INVENTION

Accordingly, an essential object of the present invention is to provide, with a view to eliminating the above mentioned drawbacks of the prior art, a safe method of recovering an information reproducing system which cannot be changed while inoperative installation region information is being set in the information reproducing system.

In order to accomplish this object of the present invention, an information recording disc according to the present invention has a burst cutting area (BCA) for recording control information for a reproducing apparatus by removing a reflective layer of the disc in a striped shape and a data recording area for recording user data, wherein the burst cutting area includes at least one BCA control information area and the BCA control information area comprises: an application identifier area for identifying applications of control data; a data length area for indicating data length of the control data; and an application specific data area for recording the control data.

Meanwhile, an information reproducing drive for reproducing data from a removable information recording medium for recording digital contents having copyright and disc region information indicative of a specific region permitting reproduction of the digital contents, according to the present invention, comprises: an installation region information storage means for storing installation region information for specifying a region in which the information reproducing drive is installed; a regional information setting counter which is updated each time the installation region information storage means is changed by a drive user; a manufacturer initialization counter which is updated each time the regional information setting counter is initialized by a drive manufacturer; a regional comparing means which delivers a regional coincidence signal upon detection through comparison that the disc region information read from the information recording medium is coincident with the installation region information stored in the installation region information storage means; a reproduction control means which reproduces the digital contents from the information recording medium only when the regional comparing means has delivered the regional coincidence signal; an initialization medium decision means for deciding whether or not the loaded information recording medium is a drive manufacturer initialization medium; a regional information updating means which updates, upon receipt of a command of update of the installation region information from the drive user, the installation region information storage means and the regional information setting counter; and a manufacturer initialization means which, upon receipt of a command of drive manufacturer initialization from the drive manufacturer, initializes the regional information setting counter and updates the manufacturer initialization counter only in a case where the initialization medium decision means decides that the loaded information recording medium is the drive manufacturer initialization medium and a count of the manufacturer initialization counter is not an initialization limit value.

Furthermore, an information recording method using an information reproducing drive for reproducing data from a removable information recording medium for recording digital contents having copyright and disc region information indicative of a specific region permitting reproduction of the digital contents, according to the present invention, comprises the steps of: storing in an installation region information storage means installation region information for specifying a region in which the information reproducing drive is installed; updating a regional information setting counter each time the installation region information storage means is changed by a drive user; updating a manufacturer initialization counter each time the regional information setting counter is initialized by a drive manufacturer; delivering from a regional comparing means a regional coincidence signal upon detection through comparison that the disc region information read from the information recording medium is coincident with the installation region information stored in the installation region information storage means; reproducing the digital contents from the information recording medium only when the regional comparing means has delivered the regional coincidence signal; deciding whether or not the loaded information recording medium is a drive manufacturer initialization medium; updating, upon receipt of a command of update of the installation region information from the drive user, the installation region information storage means and the regional information setting counter; and initializing the regional information setting counter and updating the manufacturer initialization counter upon receipt of a command of drive manufacturer initialization from the drive manufacturer only in a case where the decision step decides that the loaded information recording medium is the drive manufacturer initialization medium and a count of the manufacturer initialization counter is not an initialization limit value.

BRIEF DESCRIPTION OF THE DRAWINGS

This object and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1A:
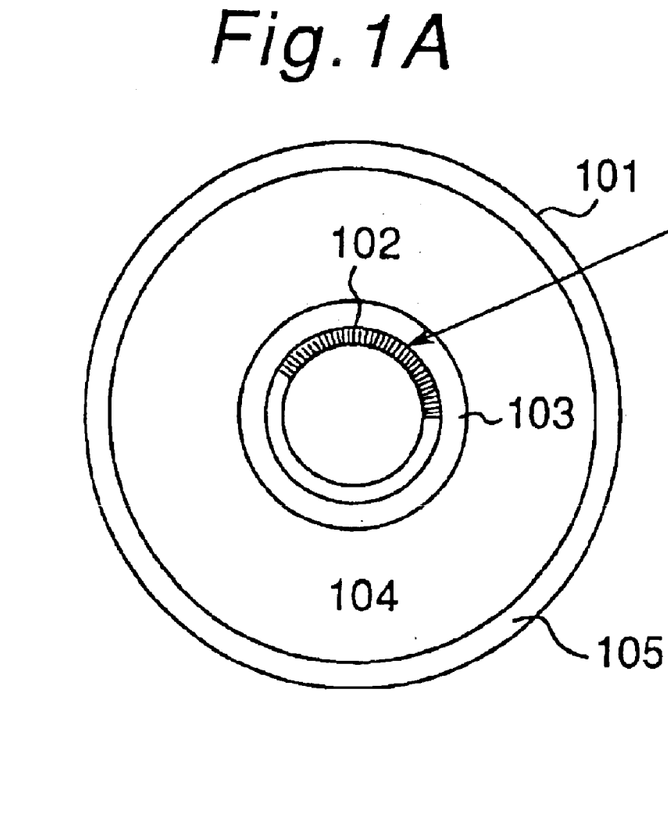
FIGS. 1A, 1B and 2A to 2C are views showing data layout of a manufacturer initialization disc according to one embodiment of the present invention.

Hereinafter, one embodiment of the present invention is described with reference to the drawings. FIGS. 1A, 1B and 2A to 2C show data layout of a manufacturer initialization disc 101 of the present invention, which is used for operation for enabling a manufacturer to reset installation region information (hereinafter, referred to as "manufacturer initialization"). FIG. 1A shows data layout of the manufacturer initialization disc 101 which is roughly divided sequentially radially outwardly into a burst cutting area (BCA) 102, a lead-in area 103, a data recording area 104 and a lead-out area 105.

Figure 3A:
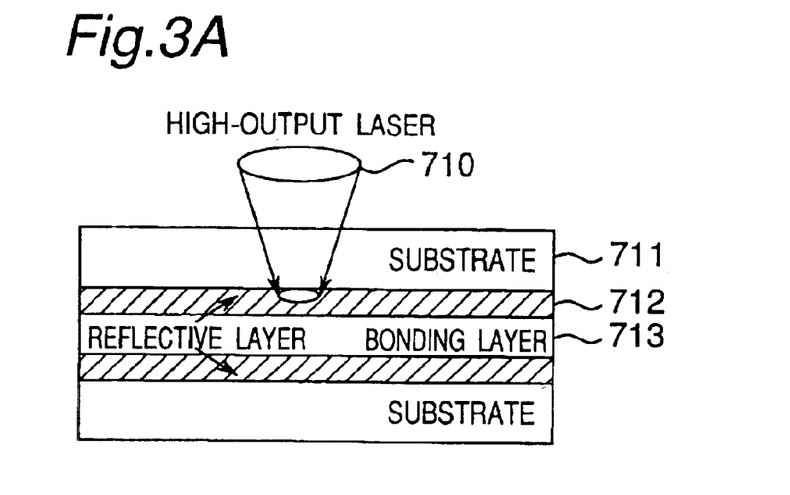
FIGS. 3A and 3B are views explanatory of a recording method of a burst cutting area (BCA) of the manufacturer initialization disc of FIG. 1A.
Figure 3B:
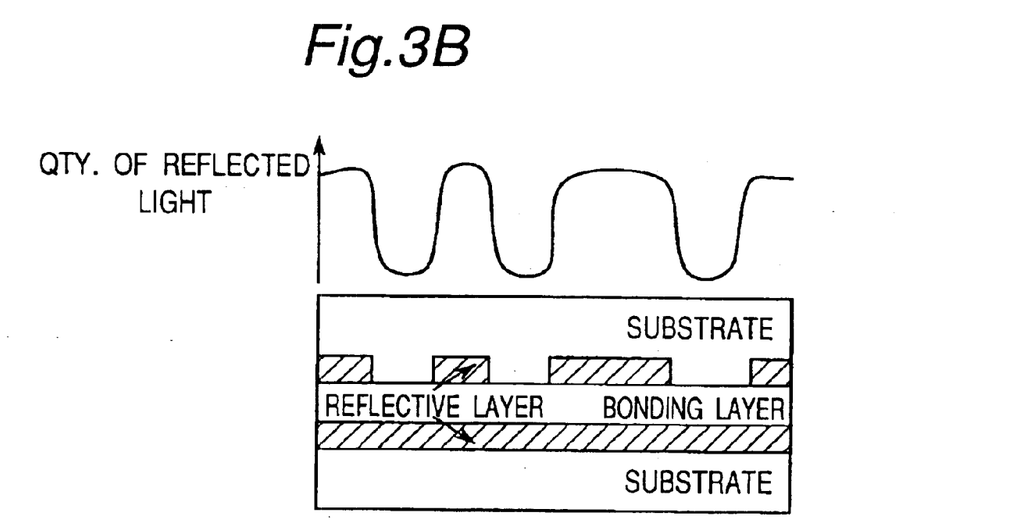

A construction of the BCA 102 is shown in FIGS. 3A and 3B. FIG. 3A is a disc sectional view explanatory of the principle of the BCA 102. The manufacturer initialization disc 101 has a construction in which one set of a substrate 711 and a reflective layer 712 are bonded to another set of the substrate 711 and the reflective layer 712 by a bonding layer 713. By irradiating a high-output laser 710 to the reflective layer 712, the reflective layer 712 can be removed partially. Therefore, by controlling output of the high-output laser 710, an arbitrary pattern can be formed in the reflective layer 712. FIG. 3B is a conceptual view explanatory of reproduction of the disc subjected to BCA working. Amplitude of the quantity of reflected light during reproduction is large in a region in which the reflective layer remains but is small in a region in which the reflective layer has been removed. By utilizing this principle, information is recorded in the BCA 102.

Figure 1B:
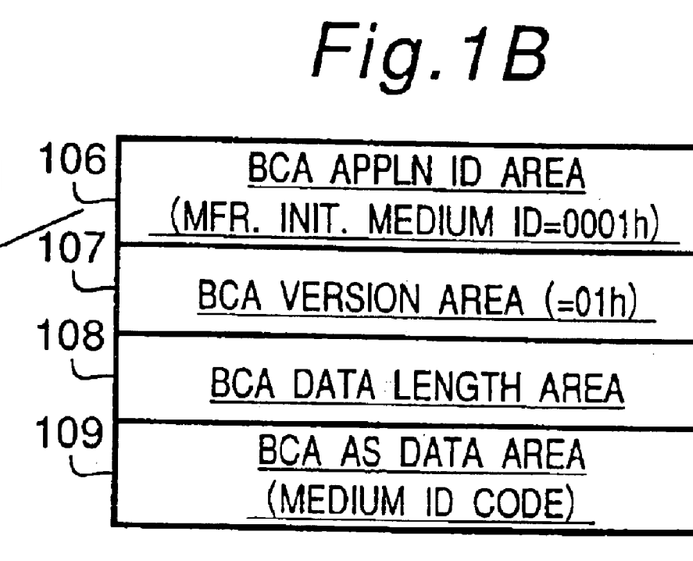

FIG. 1B shows data structure of the BCA 102. The BCA 102 includes a BCA application identifier area 106, a BCA version area 107, a BCA data length area 108 and a BCA application specific (AS) data area 109. The BCA application identifier area 106 is located at a starting position of the BCA 102. A unique code indicative of purpose of use of data of the BCA application specific data area 109 is recorded in the BCA application identifier area 106. In the case of the manufacturer initialization disc 101, "0001h" (h=hexadecimal number indicative of region setting information is recorded in an application identified. A version of rules followed by the data structure recorded in the BCA application specific data area 109 is recorded in the BCA version area 107. Data length of the BCA application specific data area 109 is designated by the BCA data length area 108. A medium identifier code is recorded in the BCA application specific data area 109 of the manufacturer initialization disc 101. It is to be noted here that the medium identifier code is an intrinsic code allotted to each of the manufacturer initialization discs 101.

Figure 2A:
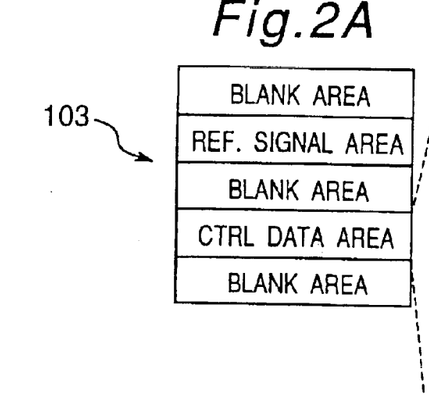

FIG. 2A shows data structure of the lead-in area 103. The lead-in area 103 includes a reference signal area and a control data area and each of the reference signal area and the control data area is interposed between blank areas in each of which data of "00h" is recorded. A reference signal which an apparatus for reproducing the manufacturer initialization disc 101 refers to as a reference is recorded in the reference signal area. Meanwhile, physical information required for the reproducing apparatus, for example, physical shape and recording density of the manufacturer initialization disc 101 is recorded in the control data area.

Figure 2B:
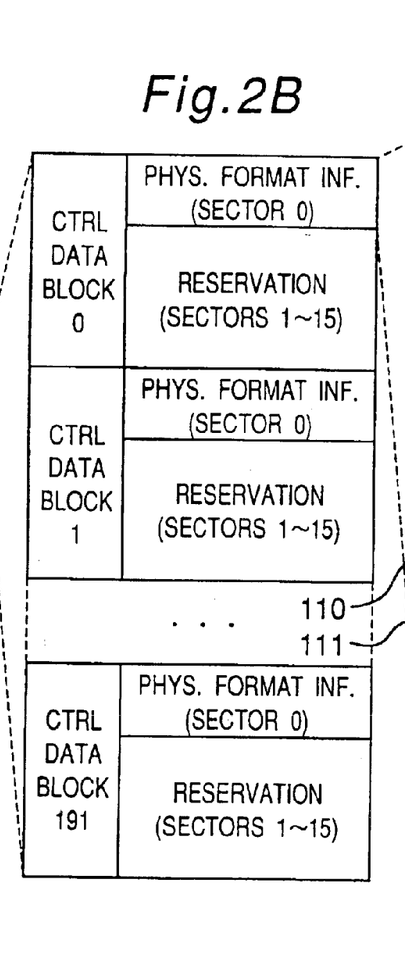

FIG. 2B shows data layout of the control data area. The control data area is constituted by 192 control data blocks from a control data block 0 to a control data block 191. Identical information is recorded in each of the 192 control data blocks. Furthermore, each of the control data blocks is constituted by 16 sectors from a sector 0 to a sector 15. Physical format information is recorded in the sector 0, while the remaining sectors 1 to 15 are reserved for future extension and each store data of "00h".

Figure 2C:
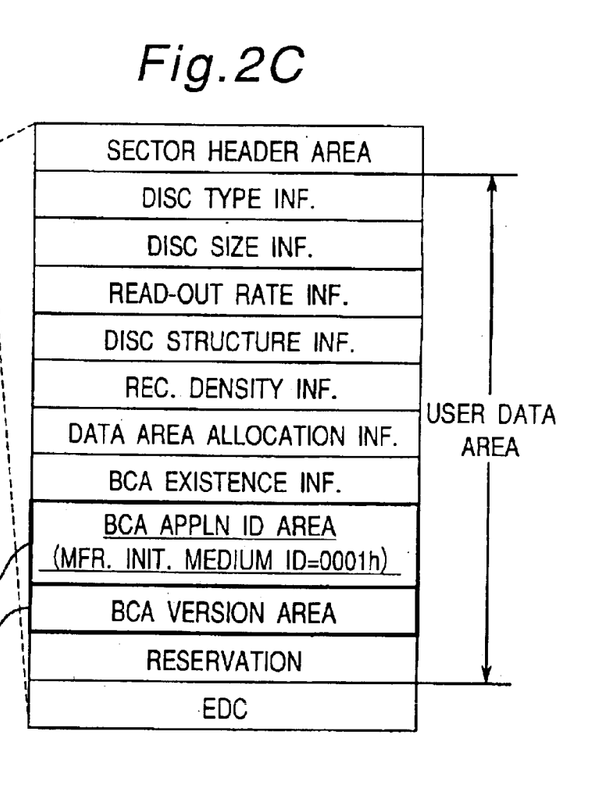

FIG. 2C shows data structure of the physical format information. The physical format information is recorded in an area of one sector. The sector includes a sector header area of 12 bytes (1 byte=8 bits), a user data area of 2048 bytes and an error detection code (EDC) area of 4 bytes. The sector header area has a configuration similar to that of the prior art shown in FIG. 7C and thus, records disc region information, etc. On the other hand, error detection codes of the sector header area and the user data area are recorded in the EDC.

Information on physical characteristics of the manufacturer initialization disc 101 is recorded in the user data area. The user data area includes a disc type information area, a disc size information area, a read-out rate information area, a disc structure information area, a recording density information area, a data area allocation information area, a BCA existence information area, a BCA application identifier area 110 and a BCA version area 111. Information for specifying a standard for reference is recorded in the disc type information area. In the case of the manufacturer initialization disc 101, information indicative of digital versatile disc read-only memory (DVD-ROM) standard is recorded in the disc type information area. Information indicating that the disc has a diameter of 120 mm is recorded in the disc size information area. Data read-out rate of the disc is recorded in the read-out rate information area. Information for discriminating whether or not the disc is a two-layer disc characteristic of the DVD is recorded in the disc structure information area. Information indicative of a single-layer disc is recorded in the disc structure information area of the manufacturer initialization disc 101. Information on recording data of data is recorded in the recording density information area. Positional information (data identifier (ID)) of a starting sector and a last sector of an area in which data is actually recorded is recorded in the data area allocation information area. Information for discriminating whether or not the disc includes the BCA is recorded in the BCA existence information area. In the manufacturer initialization disc 101, since a manufacture initialization medium identifier, the medium identifier code, etc. are recorded in the BCA, information indicative of existence of the BCA is recorded in the BCA existence information area.

The BCA application identifier area 10 for recording application of data recorded in the BCA 102 is effective for a case in which the BCA existence information indicates that the BCA exists. In the case of the manufacturer initialization disc 101, the manufacturer initialization medium identifier of "0001h" identical with that of the BCA application identifier area 106 of the BCA 102 is recorded in the BCA application identifier area 110. Version information of data recorded in the BCA application specific data area 109 of the BCA 102 is recorded in the BCA version area 111.

Figure 4:
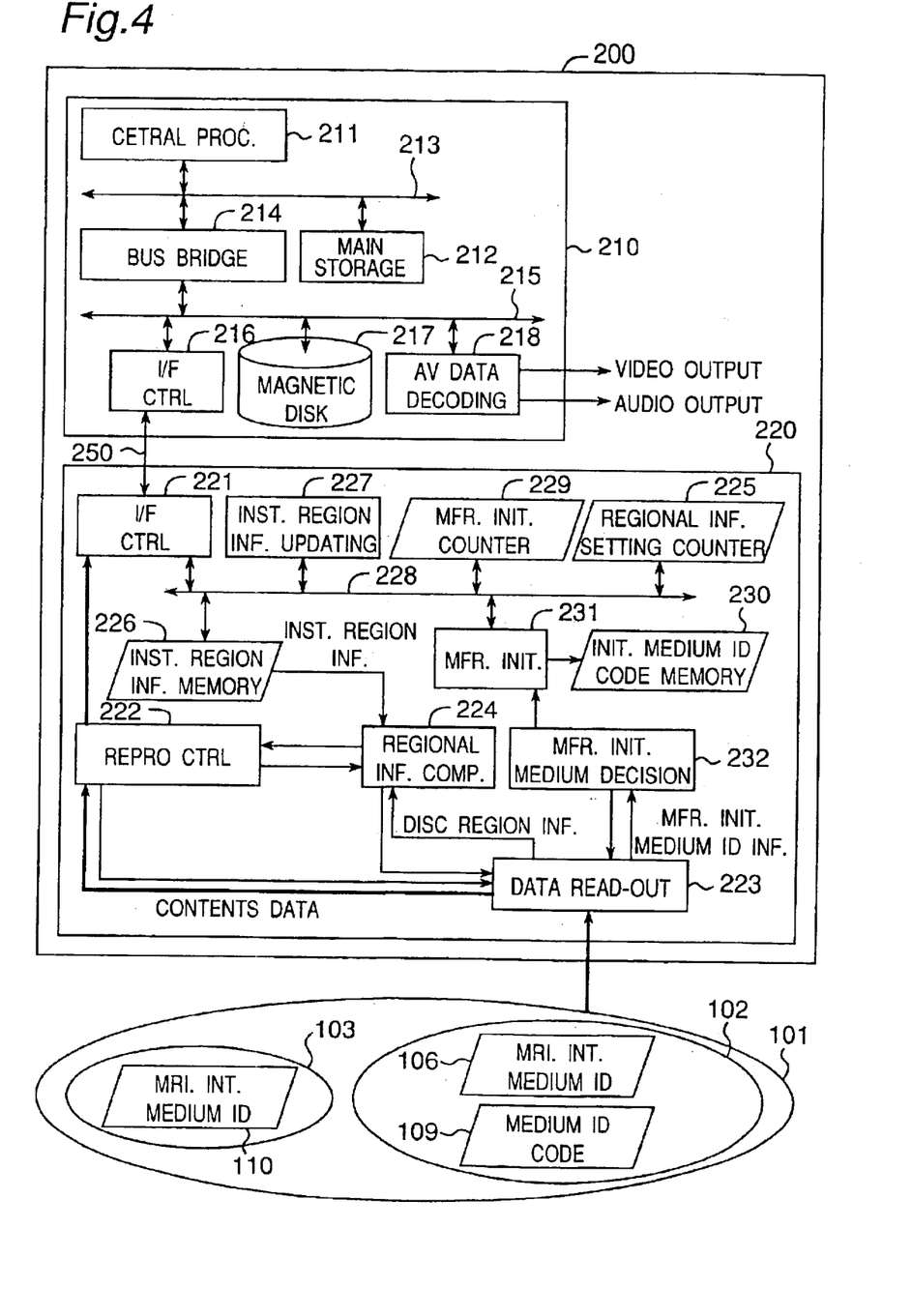
FIG. 4 is a block diagram showing a configuration of an information reproducing system according to one embodiment of the present invention.

Then, a configuration of an information reproducing system 200 in which regional information setting is initialized by using the manufacturer initialization disc 101 is described with reference to FIG. 4. The information reproducing system 200 includes a host computer 210 and a disc reproducing drive 220 which are connected to each other by a device interface bus 250. The host computer 210 includes a central processing circuit 211 for performing processing in accordance with a software program, a main storage 212 for storing programs and data, a processor bus 213 for connecting the central processing circuit 211 and the main storage 212, a bus bridge circuit 214 for connecting the processor bus 213 and an external bus 215, an interface control card 216 for controlling interface protocol with peripheral devices such as the disc reproducing drive 220 in accordance with "Small Computer System Interface" (SCSI) standard, a magnetic disk unit 217 formed by a nonvolatile memory for storing programs and data and an AV data decoding card 218 for decoding and converting compressed digital AV data into analog AV signals, with the above elements 216 to 218 being connected to the external bus 215.

The disc reproducing drive 220 includes an interface control circuit 221 for transmitting to and receiving from the host computer 210 control information and data in accordance with SCSI protocol, an installation region information memory 226 formed by an nonvolatile memory for storing installation region information of the information reproducing system 200, a regional information setting counter 225 formed by a nonvolatile memory which is decremented by 1 from a maximum permissible updating number each time the installation region information of the installation region information memory 226 is updated, a manufacturer initialization counter 229 formed by a nonvolatile memory which is decremented by 1 from a maximum initialization number each time a manufacturer of the disc reproducing drive 220 or the information reproducing system 200 initializes the regional information setting counter 225, an initialization medium identifier code memory 230 formed by a nonvolatile memory for storing history information of a reinitialization medium identifier code of a manufacturer initialization disc used during reinitialization of the regional information setting counter 225 performed by the manufacturer, an installation region updating means 227 for updating the installation region information of the installation region information memory 226 in response to a request from the host computer 210, a manufacturer initialization means 231 for reinitializing the regional information setting counter 225 in response to a request from the host computer 210, a data read-out means 223 for reading data from a loaded disc (manufacturer initialization disc 101 in FIG. 4), a manufacturer initialization medium decision means 232 for deciding whether or not the loaded disc is the manufacturer initialization disc 101, a regional information comparing means 224 for deciding whether or not the disc region information set in the loaded disc is coincident with the installation region information of the installation region information memory 226, a reproduction control means 222 which transfers AV data to the host computer 210 through the interface control circuit 221 only when the decision of the regional information comparing means 224 indicates coincidence of the disc region information and the installation region information, and a control bus 228 for transmitting control information among the constituent elements.

The manufacturer initialization disc 101 is shown in FIGS. 1A, 1B and 2A to 2C. The manufacturer initialization medium identifier is recorded in the BCA application identifier area 110 of the lead-in area 103, while the manufacturer initialization medium identifier and the medium identifier code are, respectively, recorded in the BCA application identifier area 106 and the BCA application specific data area 109 of the BCA 102. The device interface bus 250 is an SCSI bus for connection of the peripheral devices.

Then, a sequence of initialization of the regional information setting counter 225 of the information reproducing system 200 is described. It is supposed that the regional information setting counter 225 had been originally set to a number enabling update of the installation region information. Thereafter, the regional information setting counter 225 was decremented by 1 each time the installation region information of the installation region information memory 226 was updated. After the installation region information of the installation region information memory 226 was updated an update permissible number of update times, the regional information setting counter 225 is supposed to have a count of 0 at this time. Meanwhile, it is supposed that the manufacturer initialization counter 229 is set to a predetermined permissible number as an initial value and is decremented by 1 each time manufacturer initialization is performed.

Meanwhile, manufacturer initialization to be described below is not performed by a user, but is performed by a person who possesses the manufacturer initialization disc 101. In the actual market, it is supposed that manufacturer initialization is performed at, for example, a service center for maintenance of products, which is operated by a manufacturer of the information reproducing system 200. Meanwhile, it is assumed that prior to manufacturer initialization, the manufacturer initialization disc 101 has been loaded into the information reproducing system 200.

Figure 5:
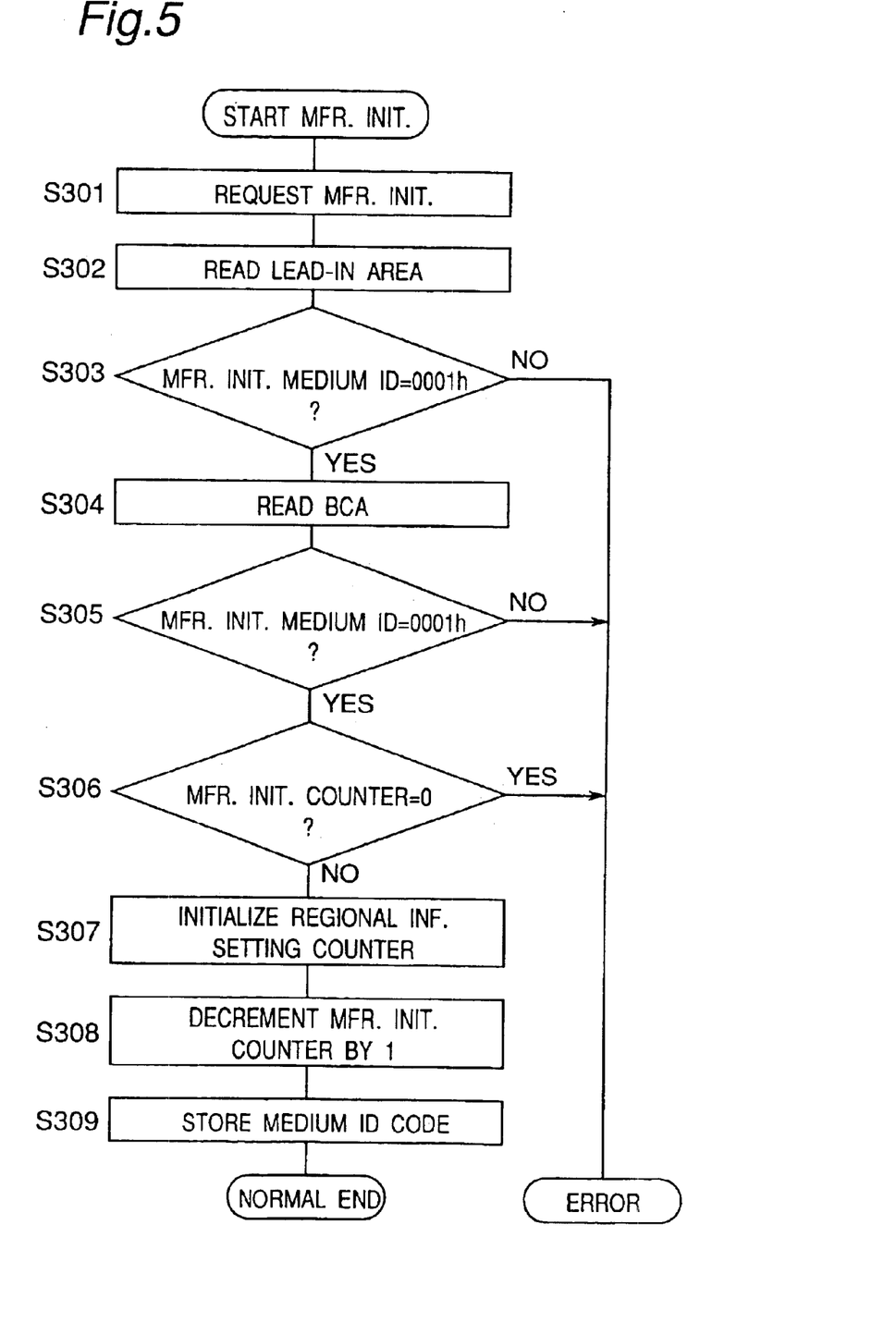
FIG. 5 is a flowchart showing a sequence of reinitialization of regional setting information in the information reproducing system of FIG. 4.

Hereinafter, a processing sequence of manufacturer initialization of the information reproducing system 200 is described with reference to FIG. 5. Initially, the host computer 210 issues to the disc reproducing drive 220 via the interface control card 216 a command of manufacturer initialization at step S301. This command of manufacturer initialization is received by the interface control circuit 221 of the disc reproducing drive 220 and is delivered to the manufacturer initialization means 231. The manufacturer initialization means 231 advances to the manufacturer initialization medium decision means 232 a request for deciding whether or not the currently loaded disc is the manufacturer initialization disc 101. Thus, tie manufacturer initialization medium decision means 232 issues to the data read-out means 223 a request for read-out of the lead-in area 103 and receives information of the lead-in area 103 of the manufacturer installation disc 101 at step S302.

Subsequently, at step S303, the manufacturer initialization medium decision means 232 decides whether or not the manufacturer initialization medium identifier of the read BCA application identifier area 110 is "00011h". In the case of "NO" at step S303, the manufacturer initialization medium decision means 232 informs the manufacturer initialization means 231 of the decision that the manufacturer initialization disc 101 is not loaded into the information reproducing system 200 at this time. Then, the manufacturer initialization means 231 informs, through the interface control circuit 221, the host computer 210 of the error, thereby resulting in erroneous end of manufacturer initialization.

On the other hand, in the case of "YES" at step S303, the manufacturer initialization medium decision means 232 requests the data read-out means 223 to read data of the BCA 102. Thus, at step S304, the data read-out means 223 reads the BCA 102 of the manufacturer initialization disc 101 and transfers the read data to the manufacturer initialization medium decision means 232. Thereafter, at step S305, the manufacturer initialization medium decision means 232 decides whether or not the manufacturer initialization medium identifier of the BCA application identifier area 106 of the received data of the BCA is "0001h". In the case of "NO" at step S305, the manufacturer initialization medium decision means 232 informs the manufacturer initialization means 231 of the decision that the manufacturer initialization disc 101 is not loaded into the information reproducing system 200 at this time. Then, the manufacturer initialization means 231 informs, through the interface control circuit 221, the host computer 210 of the error, thereby resulting in erroneous end of manufacturer initialization.

On the other hand, in the case of "YES" at step S305, the manufacturer initialization medium decision means 232 sends to the manufacturer initialization means 231 the decision that die loaded disc is the manufacturer initialization disc 101 and the medium identifier code obtained from the BCA application specific data area 109 of the BCA 102. Upon reception of the decision that the loaded disc is the manufacturer initialization disc 101, the manufacturer initialization means 231 decides whether or not count of the manufacturer initialization counter 229 is zero at step S306. In the case of "YES" at step S306, the manufacturer initialization means 231 judges that manufacturer initialization has been already performed a permissible number of times and informs, via the interface control circuit 221, the host computer 210 of the error, thus resulting in erroneous end of manufacturer initialization.

On the other hand, in the case of "NO" at step S306, the manufacturer initialization means 231 sets the regional information setting counter 225 to an initial value at step S307 such that the installation region information can be again set a predetermined number of times. Then, at step S308, the manufacturer initialization means 231 decrements the manufacturer initialization counter 229 by 1. Subsequently, at step S309, the medium identifier code of the BCA application specific data area 109 of the manufacturer initialization disc 101, which has been received from the manufacturer initialization medium decision means 232, is stored as an initialization medium identifier code in the initialization medium identifier code memory 230 by the manufacturer initialization means 231. After the above described processing has been completed, the manufacturer initialization means 231 informs, through the interface control circuit 221, the host computer 210 of a normal end.

Meanwhile, in this embodiment of the present invention, reproduction of an AV data recording disc is performed in the same manner as the prior art referred to earlier and therefore, the description is abbreviated for the sake of brevity.

Meanwhile, in this embodiment of the present invention, the manufacturer initialization counter 229, the regional information setting counter 225, the installation region information memory 226 and the initialization medium identifier code memory 230 are provided separately but are formed by nonvolatile memories, respectively. Therefore, it is needless to say that these elements may also be formed by a single nonvolatile memory.

Moreover, it goes without saying that each means of the disc reproducing drive 220 may not be formed by hardware but may be obtained by executing a software program by a microprocessor.

Thus, description of the embodiment of the present invention has been finished.

As will be seen from the foregoing description, the following effects can be achieved in the present invention. Firstly, in the present invention, loading of the disc in which the manufacturer initialization medium identifier is stored in the BCA subjected to special working is essential for reinitialization of regional information setting. Accordingly, it is possible to positively eliminate such a risk that the installation region information is updated any number of times due to propagation of software for reinitialization of regional information setting or the like.

Meanwhile, in the present invention, since the manufacturer initialization medium identifier identical with that of the BCA is provided also in the lead-in area, it is possible to prevent such a phenomenon that the information reproducing system malfunctions even if a disc in which a value identical with the manufacturer initialization medium identifier is accidentally recorded in the BCA is placed on the market. Accordingly, safety for preventing a person other than the manufacturer from illegally reinitializing regional information setting is upgraded.

Furthermore, in the present invention, the information reproducing system stores in the nonvolatile memory the initialization medium identifier code of the manufacturer initialization disc in use during manufacturer initialization. Accordingly, even if it is revealed that regional information setting has been reinitialized illegally due to propagation of the manufacturer initialization discs to the market in general and users, it is possible to control such illegal reinitialization of regional information setting by performing follow-up survey from the initialization medium identifier code stored in the nonvolatile memory of the information reproducing system.

In addition, in the present invention, the manufacturer initialization counter 229 is provided. Accordingly, even if such an incident should happen that manufacturer initialization is performed by general users, the initialization can be restricted to a limited number of times by confirming that count of the manufacturer initialization counter 229 is not zero.

What is claimed is:

1. An information reproducing drive for reproducing data from a removable information recording medium for recording digital contents having copyright and disc region information indicative of a specific region permitting reproduction of the digital contents, the information reproducing device comprising:

an installation region information storage means for storing installation region information for specifying a region in which the information reproducing drive is installed;

a regional information setting counter which is updated each time the installation region information storage means is updated by a drive user;

a manufacturer initialization counter which is updated each time the regional information setting counter is initialized by a drive manufacturer;

a regional comparing means which delivers a regional coincidence signal upon detection through comparison that the disc region information read from the information recording medium is coincident with the installation region information stored in the installation region information storage means;

a reproduction control means which reproduces the digital contents from the information recording medium only when the regional comparing means has delivered the regional coincidence signal;

an initialization medium decision means for deciding whether or not the information recording medium is a drive manufacturer initialization medium;

a regional information updating means which updates, upon receipt of a command of update of the installation region information from the drive user, the installation region information storage means and the regional information setting counter; and a manufacturer initialization means which, upon receipt of a command of drive manufacturer initialization from the drive manufacturer, initializes the regional information setting counter and updates the manufacturer initialization counter only when the initialization medium decision means decides that the information recording medium is the drive manufacturer initialization medium and a count of the manufacturer initialization counter is not an initialization limit value.

2. An information reproducing drive as claimed in claim 1, wherein when a unique identifier indicative of the drive manufacturer initialization medium is recorded in an application identifier area recorded in a burst cutting area of the information recording medium, the initialization medium decision means decides that the information recording medium is the drive manufacturer initialization medium.

3. An information reproducing drive as claimed in claim 1, wherein when a unique identifier indicative of the drive manufacturer initialization medium is recorded in an application identifier area recorded in a burst cutting area of the information recording medium and a further unique identifier indicative of the drive manufacturer initialization medium is recorded in an application identifier area recorded in a lead-in area of the information recording medium, the initialization medium decision means decides that the loaded information recording medium is the drive manufacturer initialization medium.

4. An information reproducing drive as claimed in claim 1, further comprising:

a code storage means for storing a medium identifier code of the drive manufacturer initialization medium which has been used for drive manufacturer initialization by the drive manufacturer, wherein the manufacturer initialization means stores in the code storage means the medium identifier code read from the drive manufacturer initialization medium.

5. An information reproducing method using an information reproducing drive for reproducing data from a removable information recording medium for recording digital contents having copyright and disc region information indicative of a specific region permitting reproduction of the digital contents, the information reproducing method comprising:

storing in an installation region information storage means installation region information for specifying a region in which the information reproducing drive is installed;

updating a regional information setting counter each time the installation region information storage means is updated by a drive user;

updating a manufacturer initialization counter each time the regional information setting counter is initialized by a drive manufacturer;

delivering from a regional comparing means a regional coincidence signal upon detection through comparison that the disc region information read from the information recording medium is coincident with the installation region information stored in the installation region information storage means;

reproducing the digital contents from the information recording medium only when the regional comparing means has delivered the regional coincidence signal;

deciding whether or not the information recording medium is a drive manufacturer initialization medium;

updating, upon receipt of a command of update of the installation region information from the drive user, the installation region information storage means and the regional information setting counter; and initializing the regional information setting counter and updating the manufacturer initialization counter upon receipt of a command of drive manufacturer initialization from the drive manufacturer only when the deciding operation decides that the information recording medium is the drive manufacturer initialization medium and acount of the manufacturer initialization counter is not an initialization limit value.

6. An information reproducing method as claimed in claim 5, wherein when a unique identifier indicative of the drive manufacturer initialization medium is recorded in an application identifier area recorded in a burst cutting area of the information recording medium, the deciding operation decides that the information recording medium is the drive manufacturer initialization medium.

7. An information reproducing method as claimed in claim 5, wherein when a unique identifier indicative of the drive manufacturer initialization medium is recorded in an application identifier area recorded in a burst cutting area of the information recording medium and a further unique identifier indicative of the drive manufacturer initialization medium is recorded in a application identifier area recorded in a lead-in area of the information recording medium, the deciding operation decides that the information recording medium is the drive manufacturer initialization medium.

8. An information reproducing method as claimed in claim 5, further comprising:

storing a medium identifier code of the drive manufacturer initialization medium which has been used for drive manufacturer initialization by the drive manufacturer.

* * * * *

UNITED STATES PATENT AND TRADEMARK OFFICE
CERTIFICATE OF CORRECTION

PATENT NO. : 6,958,965 B2
DATED : October 25, 2005
INVENTOR(S) : Hiroshi Ueda et al.

It is certified that error appears in the above-identified patent and that said Letters Patent is hereby corrected as shown below:

Title page,
Item [56], References Cited, FOREIGN PATENT DOCUMENTS, insert:
-- KR      1999-0060372      7/1999
   CN      401573      8/2000 --.
Item [57], ABSTRACT,
Lines 8-9, replace "data area data area" with -- data area for --.

Signed and Sealed this

Twenty-first Day of February, 2006

JON W. DUDAS
*Director of the United States Patent and Trademark Office*